Fig. 5ᵃ.

Aug. 29, 1933.   W. H. LYMAN ET AL   1,924,693
CHECK INDORSER
Filed June 11, 1928   5 Sheets-Sheet 4

Inventor:
By Walter H. Lyman & Paul J. Drieb.
Jones, Addington, Ames & Sabell. Att'ys.

Aug. 29, 1933.  W. H. LYMAN ET AL  1,924,693
CHECK INDORSER
Filed June 11, 1928   5 Sheets-Sheet 5
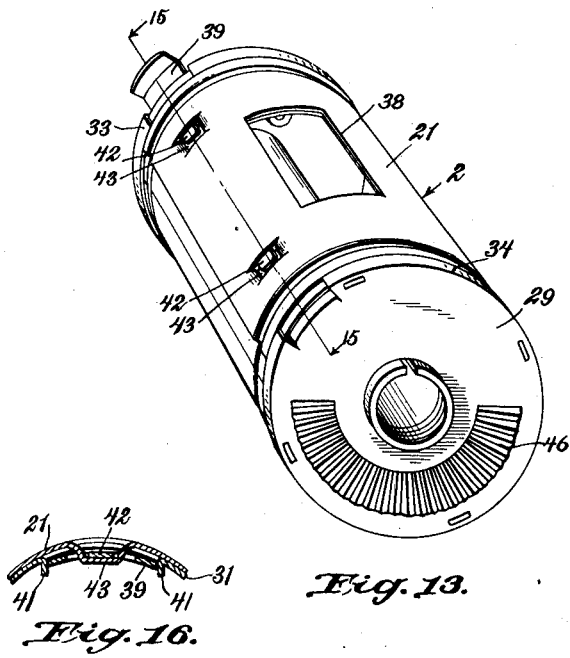
Fig. 13.
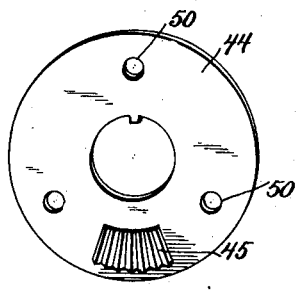
Fig. 14.
Fig. 16.
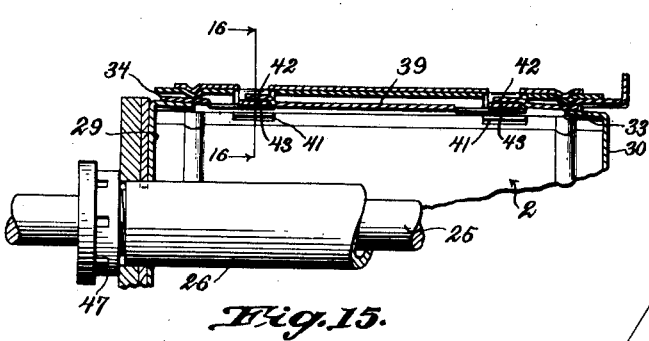
Fig. 15.
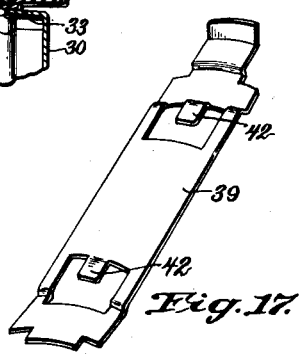
Fig. 17.
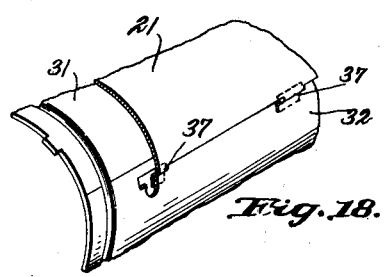
Fig. 18.
Inventor:
By Walter H. Lyman & Paul O. Nischel
Jones, Addington, Ames & Seibold
Att'ys.

Patented Aug. 29, 1933

1,924,693

UNITED STATES PATENT OFFICE 1,924,693

CHECK INDORSER

Walter H. Lyman and Paul F. Fischel, Chicago, Ill., assignors, by mesne assignments, to The International Check Endorser Co., Chicago, Ill., a corporation of Illinois Application June 11, 1928. Serial No. 284,367

29 Claims. (Cl. 101—236)

Our invention relates to check indorsers.

Among the objects of our invention are to provide a check indorser having an improved date changing construction; to provide a check indorser having an improved ink distributing construction; to provide a check indorser having an improved type cylinder construction; to provide a check indorser having an improved check aligning construction; to provide a check indorser having an improved construction for stacking the checks; to provide a check indorser which may be used to stack the checks in proper order regardless of whether the front edge of the check is lifted first or the rear edge of the check is lifted first.

Further objects will appear from the description and claims.

In the drawings in which an embodiment of our invention is shown,

Fig. 5a is a perspective view of a hinged construction;

Figure 9:
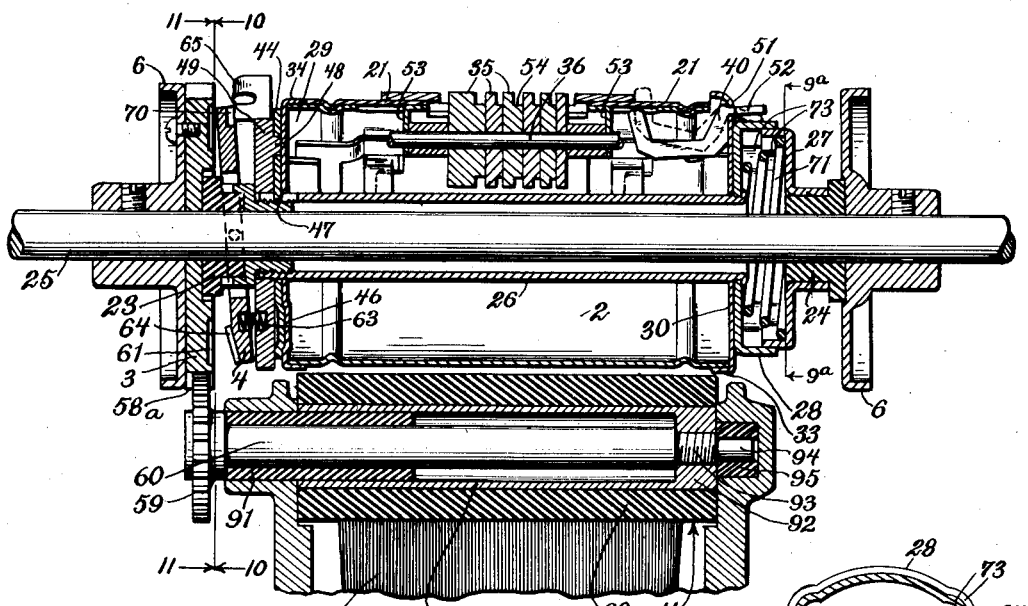
Fig. 9 is a section on the line 9—9 of Fig. 6.
Figure 10:
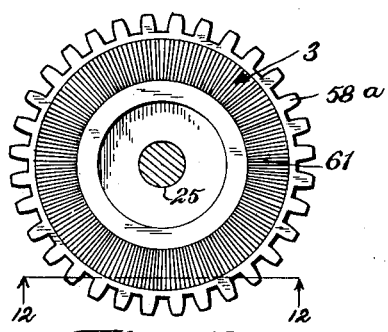
Figure 11:
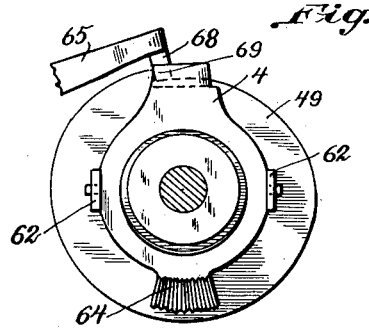
Figure 12:

Fig. 9—A is a section on the line 9A—9A of Fig. 9;

Fig. 10 is a section on the line 10—10 of Fig.9;

Fig. 11 is a section on the line 11—11 of Fig. 9;

Fig. 12 is a section on the line 12—12 of Fig. 10;

Fig. 13 is a perspective view of the type cylinder;

Fig. 14 is a perspective view of an adjusting disk for the type cylinder;

Fig. 15 is a section on the line 15—15 of Fig. 13;

Fig. 16 is a section on the line 16—16 of Fig. 15;

Fig. 17 is a perspective view of the latch for the type plate; and

Fig. 18 is a perspective view of the hinged connection for the type plate.

In order to give a bird's-eye view of the invention before describing it in detail, the construction and operation will be outlined in a broad and general way in the next few paragraphs.

Referring to the drawings in detail, the check indorser shown therein comprises an electric motor 1; a rotatable type cylinder 2; a driving clutch member 3 driven by said motor; a driven clutch member 4 carried by said cylinder 2; a rotatable cylindrical platen 5 cooperating with said type cylinder 2; a pair of paper feed wheels 6 at opposite ends of said type cylinder, respectively, and coaxial therewith; a pair of paper feed wheels 7 coaxial with said cylindrical platen 5 located at opposite ends thereof, rotatable therewith and driven from said first pair of feed wheels, respectively; means for holding said type cylinder against rotation and for holding said driven clutch member out of engagement with said driving clutch member, released by the paper as it is advanced by said feed wheels, to release the type cylinder and permit the driven clutch member to engage the driving clutch member; means for yieldingly holding said platen feed wheels against said type cylinder feed wheels, the common tangent to said type cylinder and platen being substantially vertical whereby the checks 8 as they pass between the type wheel and platen travel substantially in a vertical plane; two horizontal tables 9 and 10 spaced horizontally from each other, for holding stacks of checks, lying in a plane above said type cylinder and platen, the space between said tables lying substantially directly above the line of contact between the type cylinder and platen, whereby sheets of paper may be passed through said space to the feed wheels; means for turning each check into a horizontal plane and depositing it in a definite position after it is released from the feed rolls so that the side engaged by the type cylinder lies uppermost, whereby the checks will be stacked endorsed side up in the same order in which they were stacked on the table; means for supplying ink to said type cylinder, comprising a positively driven inking roller 11 for engaging the type cylinder; capillary means in the form of a brush 12 having upwardly extending bristles having their upper ends free and engaging said inking roller, located below said inking roller, for supplying ink thereto; and a reservoir 13 for ink in which the lower end of the bristles are immersed.

If the operator finds that it is convenient or desirable in feeding the checks from the table to the type cylinder to lift the near edge 14 of the topmost check first from the stack of checks on the table, the checks will be deposited in a stack face up on the table 9. If, on the other hand, the operator finds it convenient or desirable to lift the farther edge 15 of the topmost check first, the checks will be deposited face up on the other table 10. The operator usually has a lister side by side with the check indorser and lists each check separately, and after listing it drops it into the space between the two tables where it is grasped between the two pairs of feed rollers or wheels 6 and 7, and drawn thereby between the rotatable type cylinder and the rotatable platen. The feed wheels are constantly driven so long as the motor is running, but the type cylinder is intermittently rotated, being released for rotation and connected with the driving clutch member when a check is advanced by the feed wheels, the front edge of the check engaging a pair of clutch and latch controlling fingers 16 formed as integral parts of a pivoted yoke member. If the check should be presented to the feed wheels somewhat askew, that is, with one edge of the check somewhat in advance of the other end of the check, it will be automatically aligned by the action of the two control fingers, as these fingers will act as fulcrums for the check, the check swinging about one or the other of said fingers until it is substantially aligned, as these fingers are so positioned with respect to the feed wheels as to prevent the feed wheels from taking hold of the edge of the check until the advance edge of the check is substantially in horizontal position. The check after having passed between the type cylinder and platen and thus receiving its indorsement, drops down so that its lower edge engages the two arcuate arms 17 of the cam-controlled oscillatable check stacker which is in the position shown in dotted lines in Fig. 6 as it receives the check, and which is thereafter moved to the full line position shown in Fig. 6 in which the arcuate arms are withdrawn from underneath the lower edge of the check, and the upper pusher arms 18 engage the upper part of the check to tip it forward and cuase it to drop indorsed side up on the base plate or table 19.

Ink is supplied to the type cylinder by means of a construction shown in detail in Figs. 6, 7, 8, and 9 comprising a positively driven rubber inking roller 11 which engages the type 20 on the type plate 21 as the type cylinder is intermittently rotated, and a brush member 12 composed of vertically arranged bristles, the upper free ends of which bear softly against the lower edge of the inking roller and the lower ends of which are bound or held in a spring mounted brush holder 22 so that the lower ends of the bristles are immersed in the ink in the ink reservoir 13.

Coming now to describing the construction more in detail, the type cylinder 2, shown in detail in Figs. 6, 9, and 13 to 18 inclusive, comprises a pair of oilless bearing members 23 and 24 which may be of wood or any suitable oilless bearing material, mounted on the motor-driven shaft 25 so as to be capable of relative rotation with respect thereto, an inner, hollow, cylindrical member 26 on which one of these oilless bearings 23 is mounted, a spring housing member 27 in which the other oilless bearing 24 is mounted, having a telescopic connection with a similar spring housing member 28 secured to the inner cylindrical member 26, a pair of type cylinder heads 29 and 30 mounted on the inner cylindrical member, and a pair of outer semi-cylindrical shell members 31 and 32 matched together to form the outer type cylinder and having their end edges fitting within the circular flanges 33 and 34 of the cylinder heads, a set of changeable date and stamping wheels 35 adjustably and rotatably mounted on a shaft 36 mounted on one of the semi-cylindrical shell members 31, a semi-cylindrical type plate 21 having a hinged connection at 37 with one of the semi-cylindrical shell members 32, and having an opening 38 through which the dating wheels 35 extend for engaging the check in making the indorsement, a latch 39 (Fig. 17) slidably mounted on one of the semi-cylindrical shell members 31 for latching the pivotally mounted type plate 21 in snug engagement with the type cylinder 2, and a type plate lifting lever 40 mounted at one end of the type cylinder 2 to facilitate the separation of the type plate 21 from the type cylinder 2 when the latch 39 is moved to unlatching position.

The sliding latch 39 for the hinged type plate 21 is guided between lugs 41 struck inwardly from the sheet material of one of the semi-cylindrical type cylinder members 31 and is held up against the inner face of the shell of the type cylinder by means of the inwardly extending flanges 33 and 34 on the heads 29 and 30 of the type cylinder, as shown in Figs. 15 and 16. The type plate 21 is latched in position by means of a pair of latch fingers 42 struck up from the latch plate 39 which engage loop or strap members 43 struck inwardly from the sheet metal material of the type plate, as shown in Figs. 15, 16, and 17.

It is sometimes desirable to effect a rotary adjustment between the driven clutch member 34 and the type cylinder 2. This may be desirable in adjusting for different sizes of type plate. A type plate having a considerable extent of its surface covered with type might necessitate a different adjustment between the driven clutch member and cylinder from that required where the extent of type face was less. In order to effect this rotary adjustment, an adjusting plate 44, shown in Figs. 9 and 14, is provided having a toothed portion 45 for cooperation with a corresponding toothed portion 46 on the type cylinder head 29. To effect the desired rotary adjustment the nut 47 which is threaded into the inner sleeve 26 of the type cylinder 2 is backed off slightly by means of a suitable spanner wrench, enough to permit the teeth 45 of the adjusting plate 44 to be disengaged from the teeth 46 of the cylinder head 29 and the cylinder head is then given the desired rotary adjustment and the parts again tightened up. This adjusting plate is held in non-rotatable relation with respect to the driven clutch member by means of projections 48 on the mounting plate 49 for the driven clutch member which engage in openings 50 in the adjusting plate 44.

The operation of the machine has been outlined in the first part of the specification and will now be briefly recapitulated. The indorser is usually placed at the left-hand side of a listing machine. If the system used requires that in feeding the checks to the indorser the edge of the check nearest the operator be lifted first from the stack, the indorser will be placed with the left-hand table nearest the operator; on the other hand, if the system used requires that the edge of the check farthest from the operator be lifted first in feeding the checks to the indorser, the right-hand side of the machine will be placed nearer the operator. Assuming that the system requires that the left-hand table be nearest the operator, the stack of checks to be listed will be placed on this table with the checks lying in a position in which they can readily be read for listing. After the operator lists each check she lifts it from the stack of checks and drops it into the opening between the two tables. If the check is presented askew, that is, on the slant, it will be straightened out by means of the trip fingers so that its free edge will be properly aligned whereupon it will be seized between the two pairs of feed rolls and fed downwardly therebetween. The free edge of the check will force the trip fingers 16 downwardly lifting the bar of the yoke and thus lifting the latch member 65. This lifting of the latch member 65 allows the driven clutch member 4 to engage the driving clutch member 3 and releases the type cylinder 2 so that it is free to rotate along with the driving clutch member. As previously described, however, this rotation of the type cylinder is limited to a single revolution. Almost as soon as the type cylinder starts to revolve, the cam projection 72 releases the slidable rack 74 and the operation throws the oscillatable stacker 17 into the dotted line position shown in Fig. 6 in position to catch the check 8 as it drops from the feed rolls 6 and 7. Toward the latter part of the revolution of the type cylinder the cam 72 again engages the follower 79 on the rack and moves the stacker 17 back to the full line position shown in Figs. 2 and 6, tipping the upper edge of the check 8 away from the operator and withdrawing the curved supporting fingers from underneath the lower edge of the check so that the check will be deposited face down on the table. The upright stripper fingers 109ª prevent the check from following along with the curved supporting fingers after the leader is withdrawn.

In order to enable the operator to remove the stack of checks easily from the base or table, this base is provided with ribs or ridges 110ª to enable the finger or fingernail to be inserted under the stack of checks, and a pair of spacing webs 111 are provided to prevent the edges of the check from lying too close to the web portions 112 of the frame.

The type plate lifting lever 40 is pivotally mounted in an opening 51 in the cylinder head 30 so that by pressing down on the thumb piece 52 the lever can be moved to the dotted line position in Fig. 9, which will swing the type plate 21 away from the type cylinder 2 to enable the type plate to be readily grasped by the operator to facilitate removal and replacement.

The shaft 36 for the dating wheels 35 may be mounted in bearing lugs 53 struck inwardly from sheet metal of which the type cylinder 2 is formed. Each of the dating wheels is provided with a ratchet portion 54 for cooperation with a spring-pressed positioning pawl 55 which will properly position the dating wheels and hold them in any position to which they are set.

The drive shaft 25 is driven from the electric motor 1 by means of a worm 56 mounted on the motor shaft 57 and engaging a worm wheel 58 mounted on the drive shaft 25. The ink roller 11 is driven by means of a gear 58ª mounted on the drive shaft 25 and meshing with a pinion 59 secured to the ink roller drive shaft 60.

The clutch for controlling the connection of the type cylinder 2 with respect to the drive shaft 25 comprises the circular toothed driving clutch-face 61 formed as an integral part of the driving clutch member 3, and the annular driven toothed clutch member 4 oscillatably mounted in a pair of ears 62 secured to the annular clutch mounting plate 49 which is adjustably secured to the type cylinder head 34. A coil compression spring 63 seated in pockets in the driven clutch member 4 and clutch mounting plate 49, respectively, tends to hold the arcuate toothed portions 64 of the driven clutch member 4 in engagement with the toothed portion 61 of the driving clutch member 3.

Figure 2:
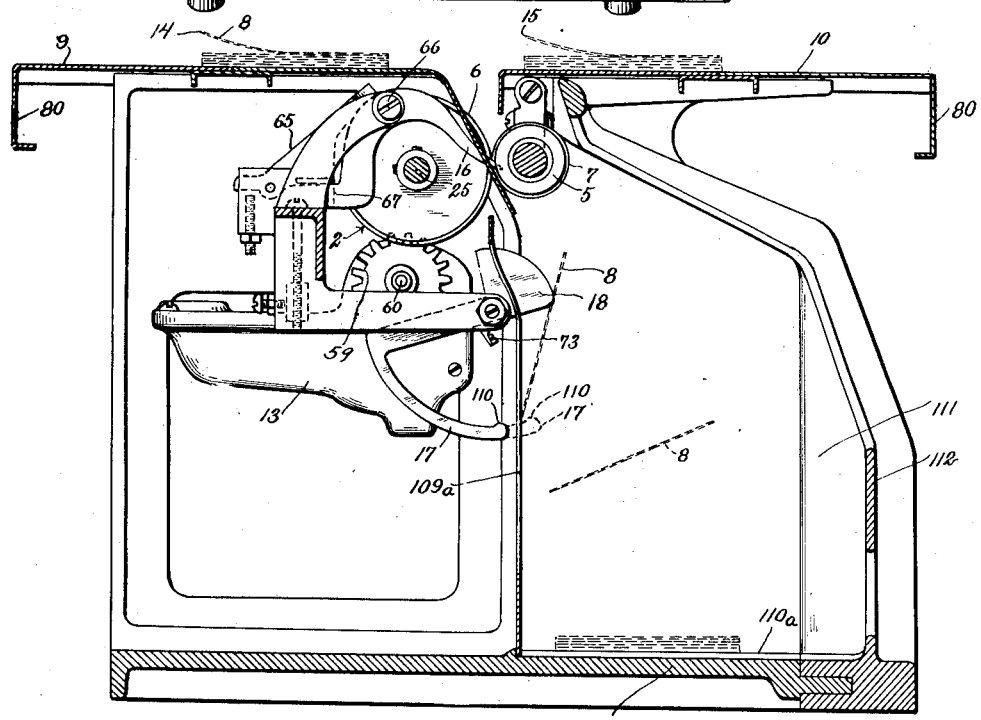
Figure 2 is a section on the line 2—2 of Fig. 3.
Figure 3:
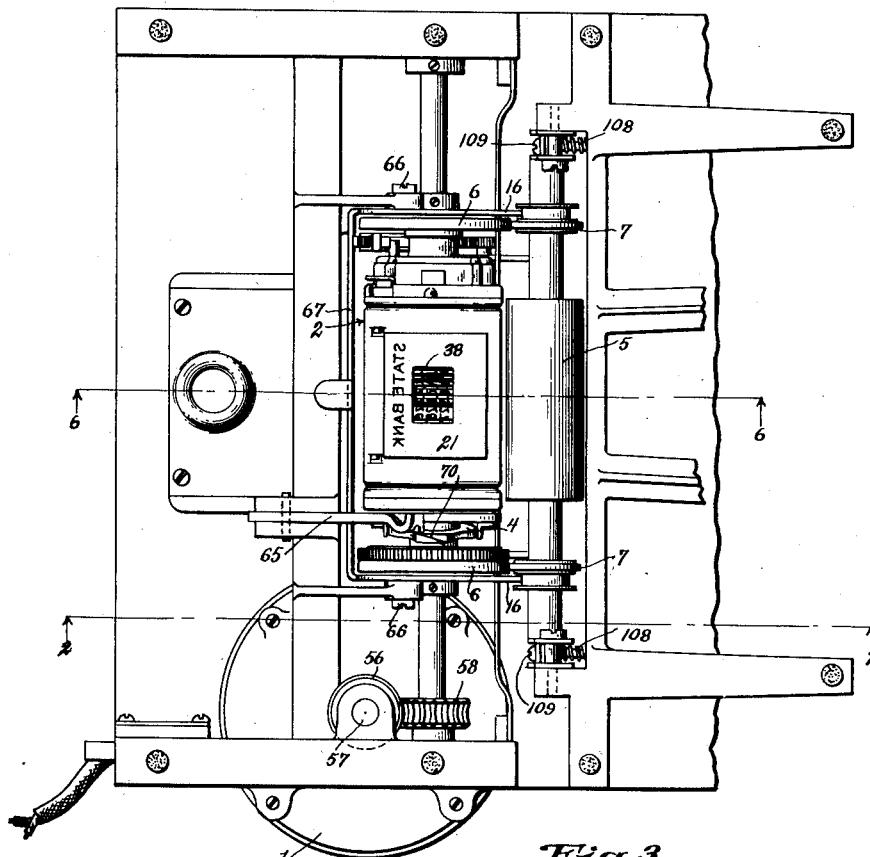
Fig. 3 is a plan view thereof with the tables removed.

The intermittent rotation of the type cylinder 2 is controlled directly by means of a pivoted member 65 controlled by the check in its travel, which serves both as a detent for holding the type cylinder 2 against rotation and as a release for feeding the driven clutch member 4 from the driving clutch member 3 at the proper time. This pivoted member is controlled by the check controlled yoke member previously described, which is pivoted at 66 and the crossbar 67 of which lies underneath the lower edge of the pivoted latch and clutch release member 65, as shown in Figs. 2 and 3. When the check feed wheels 6 and 7 take hold of the check and draw it downwardly, the forward lower edge of the check engages the two control fingers 16 swinging the yoke member about its pivot and raising the crossbar and lifting the latch member 65. This lifting of the latch member (see Fig. 11) moves the detent or finger 68 of the latch from in front of the stop shoulder 69 (Fig. 11) on the plate 49, releasing the type cylinder from the holding action of the latch, and also moves this finger from engagement with the spring-pressed pivotally mounted driven clutch member 4, (see Figs. 9 and 11) so that the spring 63 quickly snaps the toothed lower end 64 of the driven clutch member over into engagement with the toothed face 61 of the driving clutch member 3 so that the driven clutch member is caused to rotate with the driving clutch member almost at the instant the finger 68 is lifted to release the type cylinder and permit the clutch to engage.

The clutch is provided with means where only a single rotation of the type cylinder will result from the lifting of the latch member.

The finger on the latch member limits the type cylinder to a single rotation as when the type cylinder has almost completed a single revolution, the finger on the latch engages the sloping face 70 (Fig. 3) of the pivotally mounted driven clutch member 4 causing the driven clutch member to move out of engagement with the driving clutch member back to the position shown in Figs. 3 and 9. The type cylinder is positively stopped in a definite position by the engagement of the shoulder 69 of the plate 49 with the finger 68 on the latch, the frictional engagement between the shaft 25 and the bearings 23 and 24 being amply sufficient to bring the shoulder against the finger in the event the driven clutch member might be released from the driving clutch member a trifle before the shoulder on the plate engages the finger on the latch.

Figure 6:
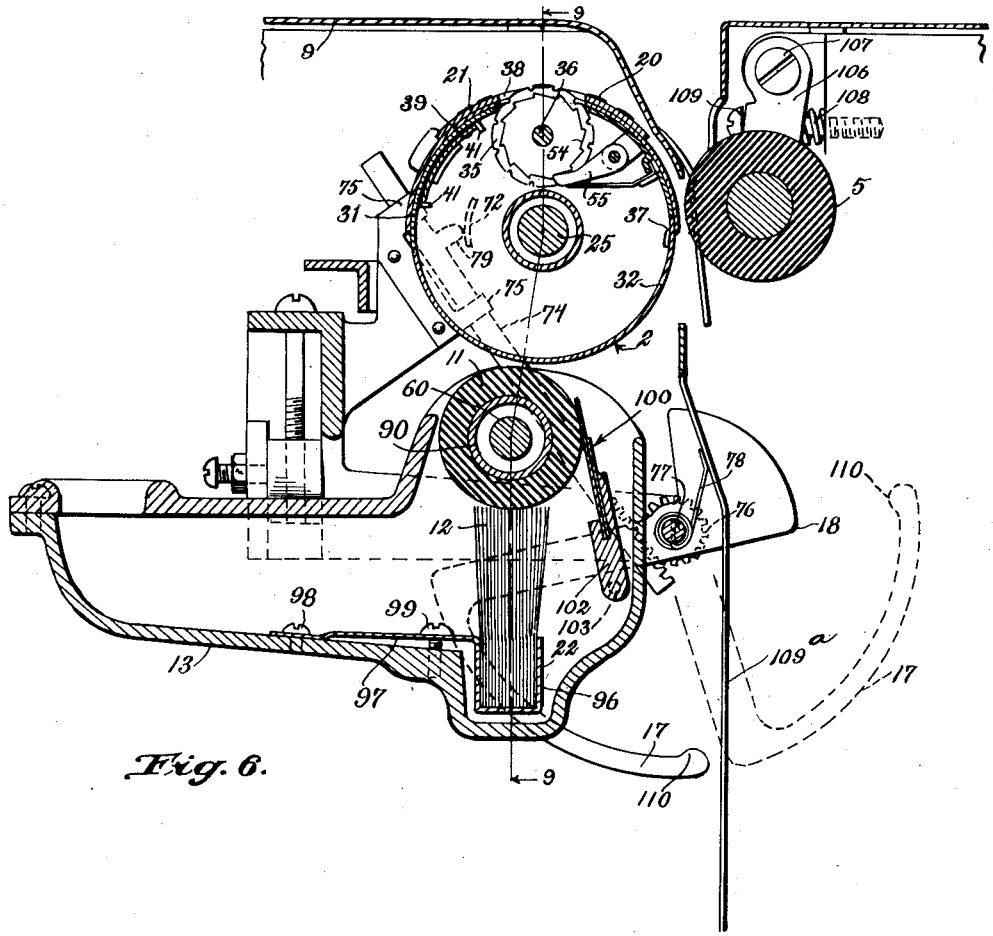
Fig. 6 is a section on the line 6—6 of Fig. 3.

It is sometimes desirable to rotate the type cylinder backward, for instance, in removing the type plate from the type cylinder. Referring to Fig. 6 it will be seen that the type cylinder has been stopped in a position in which the hinge 37 of the type plate is so located that it would be difficult to remove the type plate from the type cylinder without turning the type cylinder backward to move the hinge to a position which would permit of the ready separation of the type plate from the type cylinder.

Figure 9A:
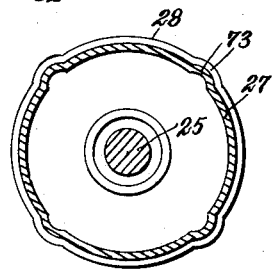

In order to enable this backward rotation of the type cylinder to be effected, the type cylinder is so mounted with respect to the drive shaft that it may be slipped endwise with respect to the shaft to move the driven clutch member to a position in which it cannot cooperate with the driving clutch member, that is, to a position in which the teeth on the driven clutch member cannot engage the teeth on the driving clutch member. The provisions whereby this sliding movement of the type cylinder may be effected comprise the telescoping connection between the two members 27 and 28 which house the coil compression spring 71. The two spring housing members are so fitted to each other as to permit of a telescoping movement, but prevent relative rotation between the housing members. Relative rotation between the housing members must not be permitted because the housing member 27 carries a cam member 72 (Fig. 6) which controls the check stacking member 17 which must be properly timed with respect to the clutch member 4 carried by the type cylinder 2. Rotation between the two telescoping parts is prevented by providing the two telescoping members with interfering bosses 73 (Figs. 9 and 9a) which effect a sort of splined connection permitting relative longitudinal movement but preventing relative rotation.

The transmission from the cam 72 on the spring housing member 27 to the oscillatable stacker 17 comprises a rack member 74 slidably mounted in suitable bearings 75, the rack portion of which engages a pinion 76 secured to the shaft 77 on which the oscillatable stacker 17 is mounted. A coil torsion spring 78 tends to hold the oscillatable stacking member 17 in the dotted line position shown in Fig. 2. In the operation of this stacking device, and referring particularly to Figs. 2 and 6, almost the instant the type cylinder is released for rotation the cam projection 72 on the housing member moves out of engagement with the follower finger 79 on the slidable rack 74 whereupon the coil torsion spring 78 immediately snaps the oscillatable stacker 17 into the dotted line position shown in Fig. 6. In this position the curved fingers of the check stacker are in position to catch the check as it drops from the feed wheels 6 and 7 and hold it until the cam projection 72 on the housing member again engages the follower finger on the rack 79, the effect of which is to lift the rack member and swing the oscillatable stacker back into the full line position shown in Figs. 2 and 6, which causes the upper pusher end 18 of the check stacker to tilt the upper edge of the check forwardly and cause the curved member to be withdrawn from underneath the lower edge of the check 8, causing the check to drop, endorsed side up, onto the table or base 19.

Referring more in detail to the purpose and use of the two tables 9 and 10 located on opposite sides of the indorser, each of these tables is made in two parts, the parts being connected together by hinges so that one part of each table may be folded back onto another part. The swinging part of each of the tables is provided with a downwardly extending flange 80 which when the hinged portion is swung so as to lie on top of the fixed portion of the table, as shown in dotted lines in Fig. 1, provides a guide or abutment to facilitate the insertion of the checks into the opening or space between the two tables.

Figure 5:
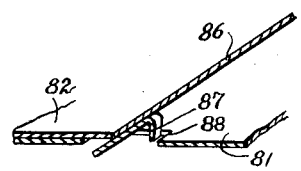
Fig. 5 is a section on the line 5—5 of Fig. 4.
Figure 5:
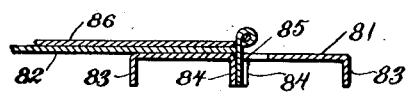
Figure 4:
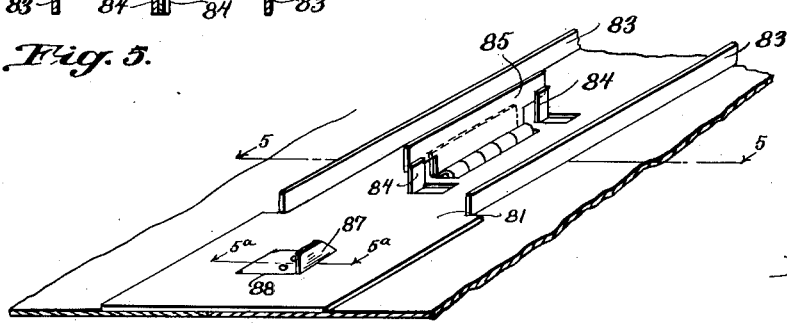
Fig. 4 is a bottom view showing the table hinge.

In order that the table sections may lie in the same place when extended and form a smooth flush surface on which to place the pile of checks, a special hinged construction is provided, shown in detail in Figs. 4, 5, and 5a. This special hinged construction comprises a plate member 81 secured to the stationary table section 82 having a pair of stiffening ribs 83 bent up therefrom, and having hinge guiding lugs 84 struck up therefrom, lying between the stiffening flanges 83 between which lugs one leaf 85 of the hinged member may be slidably mounted so as to be capable of a limited vertical movement to permit this hinge member to move from the position shown in Fig. 5 in which one table section 86 is folded back on top of the other, 82, to the position shown in Fig. 5a in which the hinge section has slipped down so as to lie substantially beneath the upper surface of the table. In order to insure that the swinging section of the table swings down to lie flush with the fixed section of the table, the swinging section is provided with a plurality of guide finger members 87 which operate in openings 88 in the plate member, these finger members slipping under the fixed section of the table as the hinged section approaches its flush position.

Figure 1:
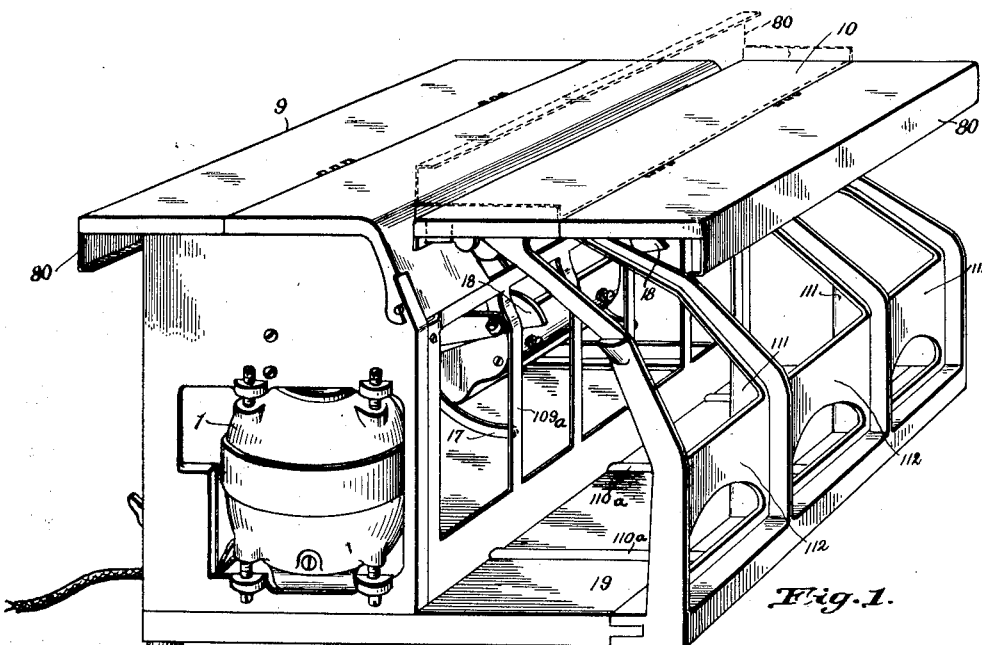
Figure 1 is a perspective view of the check indorser.

As previously indicated, if the operator finds it convenient or desirable to pick up the checks from the stacker on the table by lifting the nearer edge of the check first, the stack of checks will be placed on the left-hand table 9, as seen in Figs. 1 and 2, which, as will be seen from following out the operation of the check stacker previously described, will cause the checks to be disposed endorsed side up on the table or base 19. If, however, the operator finds it convenient or desirable to lift the farther edge of the check first in feeding from the stack on the table, the stack of checks should be placed on the right-hand table 10, in which event also, as will be seen in following out the operation of the stacker, the check will be indorsed on its back and disposed indorsed side up on the table or base plate. In either event, the checks will be deposited face down in the same order in which they were stacked on the table before being fed to the indorser.

Referring more in detail to the ink roller and associated mechanism, the rubber sleeve 89 of the ink roller 11 is secured to a metal sleeve 90, one end of which receives the inner end of an oilless bearing member 91 which forms a bearing for this end of the metal sleeve 90, and the other end of which metal sleeve is provided with a head 92 into which the drive shaft 60 is screwed, the thread 93 on this shaft being such that the driving action of the shaft is such as to screw the threads into the head of the sleeve 90. The same oilless bearing member 91 provides a bearing for one end of the drive shaft 60, the other end, 94, of which shaft is reduced and mounted in another oilless bearing member 95 seated in a pocket in the end of the ink reservoir 13.

The lower ends of the bristles are secured in a pocket 96 formed in a sheet metal member having a broad leaf spring extension 97, the end of which is secured to the ink reservoir by means of screws 98. In order to limit or adjust the pressure of the upper ends of the bristles 12 on the inking roller 11, adjusting screws 99 are provided extending loosely through openings in the leaf spring member 97 and threaded into the lower part of the ink reservoir 13.

An adjustable pivoted ink spreader or scraper member 100 (Figs. 6, 7, and 8) is provided in the form of a flexible leaf spring 101 secured to a mounting plate 102 which is pivotally mounted on the ink reservoir by means of pivot screw pins or screws 103 and which is adjustably held against the inking roller 11 by means of a pair of adjusting screws 104 threaded through the wall of the ink receptacle and held in adjusted position by means of lock nuts 105.

The platen 5 and feed wheels 7 are mounted on a shaft which is rotatably mounted in bearing brackets 106, pivotally mounted at 107 and yieldingly pressed toward the type cylinder 2 and feed wheels 6 by means of coil compression springs 108 surrounding the screws 109, respectively. The contact pressure between the feed wheels 6 and 7 may be limited and the pivotal movement of the brackets 106, as shown in Fig. 6.

In order to prevent the checks from slipping off from the supporting fingers 17 accidentally and prematurely, the ends of these fingers are provided with retaining projections 110 which will hold the edge of the check until the fingers are withdrawn through the stripper bars 109a.

Due to the fact that two tripper fingers 16 are provided spaced a substantial distance apart, the indorsement may be placed in any desired position on the check as either end of the check may be used for tripping, or both ends if it is desired that the indorsement be centrally placed.

The base plate 19 may be provided with raised ribs 110a to hold checks slightly spaced from the base plate to facilitate getting hold of them for removal.

Figures 7, 8:
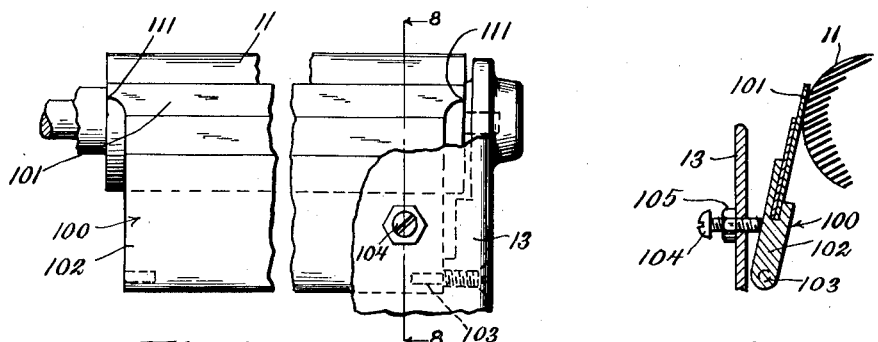
Fig. 7 is a detail of the ink distributing construction.
Fig. 8 is a section on the line 8—8 of Fig. 7.

As shown in Fig. 7 the upper portions of the ends of the scraper 101 project beyond the body portion so that as these end portions 111 scrape the ink from the roller 11, the ink will be directed inwardly away from the ends of the roller 11, thus minimizing the chance of leakage of ink along the ends of the roller and out through the opening between the shaft 60 and the bearing 91.

While we have described but one embodiment of our invention, it is obvious that many modifications therein may occur to those skilled in the art, and we desire, therefore, that our invention be limited only by the scope of the appended claims and by the prior art.

We claim:

1. A check indorser comprising a motor, a rotatable type cylinder, a driving clutch member driven by said motor, a driven clutch member carried by said cylinder, a rotatable cylindrical platen cooperating with said type cylinder, a pair of paper feed wheels at opposite ends of said type cylinder, respectively, and coaxial therewith, a pair of paper feed wheels coaxial with said cylindrical platen located at opposite ends thereof, rotatable therewith and driven from said first pair of feed wheels, respectively, means for holding said type cylinder against rotation and for holding said driven clutch member out of engagement with said driving clutch member released by the paper as it is advanced by said feed wheels, to release the type cylinder and permit the driven clutch member to engage the driving clutch member, means for yieldingly holding said platen feed wheels against said type cylinder feed wheels, the common tangent to said type cylinder and platen being substantially vertical whereby the checks as they pass between the type wheel and platen travel substantially in a vertical plane, two horizontal tables spaced horizontally from each other, for holding stacks of checks, lying in a plane above said type cylinder and platen, the space between said tables lying substantially directly above the line of contact between the type cylinder and platen, whereby sheets of paper may be passed through said space to the feed wheels, and means for turning each check into a horizontal plane and depositing it in a definite position after it is released from the feed rolls so that the side engaged by the type cylinder lies uppermost, whereby the checks will be stacked indorsed side up in the same order in which they were stacked on the table.

2. A check indorser comprising a rotatable type cylinder, a driving shaft coaxial with said cylinder and extending therethrough, and clutch means for connecting and disconnecting said cylinder with respect to said driving shaft, said clutch mechanism comprising a clutch member rotatable with said shaft and a clutch member carried by said drum, said drum being mounted for axial movement with respect to said shaft to move the clutch member carried by the drum into inoperative relation with respect to the other clutch member to enable the drum to be turned backward.

3. A check indorser comprising a rotatable type cylinder, a driving shaft coaxial with said cylinder and extending therethrough, and clutch means for connecting and disconnecting said cylinder with respect to said driving shaft, said clutch mechanism comprising a clutch member rotatable with said shaft and a clutch member carried by said drum, said drum being mounted for axial movement with respect to said shaft to move the clutch member carried by the drum into inoperative relation with respect to the other clutch member to enable the drum to be turned backward and spring means exerting axial pressure on said drum and normally holding said drum in a position in which said clutch members may cooperate.

4. A check indorser comprising a rotatable type cylinder, a rotatable driving member, and check controlled means for connecting and disconnecting said type cylinder with respect to said driving member comprising a pair of trip members, one substantially at each end of said cylinder whereby either end or both ends of a check may be used for tripping, whereby the indorsement may be placed in any desired position on the check, and means for feeding a check comprising two pairs of feed wheels, each pair being adjacent one of said trip members, said feed wheels lying between said pair of trip members whereby if a check is presented to the feed wheels askew, one end of its front edge will strike one of said trip members and be retarded until the front edge is properly aligned.

5. A check indorser comprising a rotatable type cylinder, a rotatable platen cooperating with said type cylinder, the common tangent to the platen and cylinder extending substantially vertically, and means for receiving the checks after they have passed between the type cylinder and platen and stacking them indorsed side up, comprising a member for engaging and holding the lower edge of the check, and a member for engaging the upper portion of the check and tipping it so as to be stacked indorsed side up.

6. A check indorser comprising a rotatable type cylinder, a rotatable platen cooperating therewith, the common tangent to said cylinder and platen extending substantially vertically whereby the check will travel substantially in a vertical plane as it is being indorsed, means for receiving said checks after being indorsed and stacking them indorsed side up, and two horizontal tables lying substantially in the same horizontal plane above said type cylinder and spaced horizontally from each other, the space between said tables lying substantially above the line of contact of the type cylinder and platen whereby checks may be fed from either of said tables to the type cylinder through the space between the tables and whereby one table may be used as a support if the edge of the check nearest the operator is lifted from the stack first, and whereby the other table may be used as a check support if the edge of the check farthest from the operator is lifted first.

7. A check indorser comprising a rotatable type cylinder, a rotatable platen cooperating therewith, the common tangent to said cylinder and platen extending substantially vertically whereby the check will travel substantially in a vertical plane as it is being indorsed, means for receiving said checks after being indorsed, and stacking them indorsed side up, and two horizontal tables lying substantially in the same horizontal plane above said type cylinder and spaced horizontally from each other, the space between said tables lying substantially above the line of contact of the type cylinder and platen whereby checks may be fed from either of said tables to the type cylinder through the space between the tables and whereby one table may be used as a support if the edge of the check nearest the operator is lifted from the stack first, and whereby the other table may be used as a check support if the edge of the check farthest from the operator is lifted first, one of said tables having a hinged part having an abutment portion which can be swung into position to serve as a guide for the checks as they are fed from the other table.

8. A check indorser comprising a rotatable type cylinder, a rotatable platen cooperating therewith, the common tangent to said cylinder and platen extending substantially vertically whereby the check will travel substantially in a vertical plane as it is being indorsed, means for receiving said checks after being indorsed, and stacking them indorsed side up, and two horizontal tables lying substantially in the same horizontal plane above said type cylinder and spaced horizontally from each other, the space between said tables lying substantially above the line of contact of the type cylinder and platen whereby checks may be fed from either of said tables to the type cylinder through the space between the tables and whereby one table may be used as a support if the edge of the check nearest the operator is lifted from the stack first, and whereby the other table may be used as a check support if the edge of the check farthest from the operator is lifted first, and an abutment member which may be moved from inoperative position to a position in which it serves as a guide for the checks as they are fed from the table.

9. A printing device comprising a rotatable type cylinder, two spaced check supporting tables above said type cylinder, the space between said tables serving as an opening for feeding checks to said type cylinder, one of said tables having a fixed portion and a hinged portion, said hinged portion having a flange which extends downwardly when said hinged portion is in position for use as a table, said hinged portion being swingable about its hinge to a position in which said flange extends upwardly adjacent said feed opening as a paper positioning and guide member.

10. A printing device comprising a rotatable type cylinder, two spaced check supporting tables above said type cylinder, a space between said tables serving as an opening for feeding checks to said type cylinder, one of said tables having a fixed portion and a hinged portion, said hinged portion having a flange which extends downwardly when said hinged portion is in position for use as a table, said hinged portion being swingable about its hinge to a position in which said flange extends upwardly adjacent said feed opening as a paper positioning and guide member, said fixed portion and hinged portion being formed in general of flat sheet material, the hinge construction comprising an aligning tongue on the hinged portion extending under the fixed portion.

11. A printing device comprising a rotatable type cylinder, two spaced check supporting tables above said type cylinder, a space between said tables serving as an opening for feeding checks to said type cylinder, one of said tables having a fixed portion and a hinged portion, said hinged portion having a flange which extends downwardly when said hinged portion is in position for use as a table, said hinged portion being swingable about its hinge to a position in which said flange extends upwardly adjacent said feed opening as a paper positioning and guide member, said fixed portion and hinged portion being formed in general of flat sheet material, the hinge construction comprising an aligning tongue on hinged portion extending under the fixed portion, and an aligning tongue on the fixed portion extending under the hinged portion.

12. A slip-printing device comprising a rotatable type cylinder, a rotatable platen cooperating with said type cylinder, the common tangent to the platen and type cylinder extending substantially vertically, and means for receiving and stacking the slips after they have passed between the type cylinder and platen comprising an oscillatable device having a lower portion for engaging and supporting the lower edge of the slip and an upper portion for engaging the upper portion of the slip and tipping it, said lower portion being withdrawable from underneath the slip to permit it to drop.

13. A slip-printing device comprising a rotatable type cylinder, a rotatable platen cooperating with said type cylinder, the common tangent to the platen and type cylinder extending substantially vertically, means for receiving and stacking the slips after they have passed between the type cylinder and platen comprising an oscillatable device having a lower portion for engaging and supporting the lower edge of the slip and an upper portion for engaging the upper portion of the slip and tipping it, said lower portion being withdrawable from underneath the slip to permit it to drop, and a stripper for holding the slip against movement with the withdrawable portion to insure freeing it therefrom.

14. A slip-printing device comprising a rotatable type cylinder, a rotatable platen cooperating with said type cylinder, the common tangent to the said platen and cylinder extending substantially vertically, a table for the slips above said type cylinder, an ink reservoir underneath said type cylinder, a frame for supporting said type cylinder and ink reservoir, and upright supporting means spaced from said framework to provide storage space for the printed slips, said platen being mounted on said spaced supporting means.

15. A slip-printing device comprising a rotatable type cylinder, a rotatable platen cooperating with said type cylinder, the common tangent to the said platen and cylinder extending substantially vertically, a table for the slips above said type cylinder, an ink reservoir underneath said type cylinder, a frame for supporting said type cylinder and ink reservoir, upright supporting means spaced from said framework to provide storage space for the printed slips, said platen being mounted on said spaced supporting means, and a second table for the slips also mounted on said spaced supporting means.

16. A slip-printing device comprising a rotatable horizontal type cylinder, a rotatable horizontal platen cooperating with said type cylinder, a slip-supporting table above said type cylinder, an ink reservoir underneath said type cylinder, a motor having a vertical shaft, a clutch for intermittently connecting the type cylinder with the motor, means for throwing out the clutch and stopping the type cylinder in a definite position, and transmission from said motor to said clutch comprising a worm on the vertical motor shaft and a worm gear coaxial with the type cylinder and driven from said worm.

17. A slip-printing device comprising a constantly-driven motor, an intermittently-driven type cylinder driven from said motor, clutch means for controlling the rotation of the type cylinder, stop means for stopping the type cylinder in a definite position, a constantly-driven platen driven from said motor and cooperating with said type cylinder, an inking roller engageable with the type on the type cylinder driven from said motor, constant driving means for the inking roller, and a feed wheel for the slips constantly driven from said motor and coaxial with the type cylinder and having substantially the same diameter as the type cylinder.

18. A slip-printing device comprising a constantly-driven motor, an intermittently-driven type cylinder driven from said motor, clutch means for controlling the rotation of the type cylinder, stop means for stopping the type cylinder in a definite position, a constantly-driven platen driven from said motor and cooperating with said type cylinder, an inking roller engageable with the type on the type cylinder driven from said motor, constant driving means for the inking roller, and a feed wheel constantly driven from said motor and coaxial with the platen and having substantially the same diameter as the platen.

19. A slip-printing device comprising a constantly-driven motor, an intermittently-driven type cylinder driven from said motor, clutch means for controlling the rotation of the type cylinder, stop means for stopping the type cylinder in a definite position, a constantly-driven platen driven from said motor and cooperating with said type cylinder, an inking roller engageable with the type on the type cylinder driven from said motor, constant driving means for the inking roller, a feed wheel for the slips constantly driven from said motor and coaxial with the type cylinder and having substantially the same diameter as the type cylinder, and a second feed wheel constantly driven from said motor and coaxial with the platen and having substantially the same diameter as the platen.

20. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, underneath said type cylinder, engageable with said type cylinder and rotatable at the same surface speed and constantly driven by said motor, a reservoir for liquid ink underneath said inking roller, said roller being above the level of the liquid ink of the reservoir, means for supplying ink from said reservoir to said roller, means for removing the surplus ink supply and returning it to the reservoir, a platen cooperating with said cylinder and rotatable about a horizontal axis, the axis of the type cylinder and platen lying in substantially a horizontal plane, said platen being constantly driven from said motor, slip-controlled means for controlling said initiating means, a receptacle for the printed slips, a partition between the receptacle and ink reservoir provided with an opening, and stacking means for the slips operating through said opening to stack the slips in the receptacle.

21. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, underneath said type cylinder, engageable with said type cylinder and rotatable at the same surface speed and constantly driven by said motor, a reservoir for liquid ink, means for supplying ink from said reservoir to said roller, a platen cooperating with said cylinder and rotatable about a horizontal axis, the axis of the type cylinder and platen lying in substantially a horizontal plane, said platen being constantly driven from said motor, a receptacle for the printed slips, a partition between the receptacle and ink reservoir provided with an opening, and stacking means for the slips operating through said opening to stack the slips in the receptacle.

22. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, engageable with said type cylinder and rotatable at the same surface speed and constantly driven by said motor, a reservoir for liquid ink, means for supplying ink from said reservoir to said roller, a receptacle for the printed slips, a partition between the receptacle and ink reservoir provided with an opening, and stacking means for the slips operating through said opening to stack the slips in the receptacle.

23. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, engageable with said type cylinder and rotatable at the same surface speed and constantly driven by said motor, a reservoir for liquid ink, said roller being above the level of the liquid ink of the reservoir, means for supplying ink from said reservoir to said roller, and means for removing the surplus ink supply and returning it to the reservoir.

24. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, underneath said type cylinder, engageable with said type cylinder and rotatable at the same surface speed and constantly driven by said motor, a reservoir for liquid ink, underneath said inking roller, said roller being above the level of the liquid ink of the reservoir, and means for supplying ink from said reservoir to said roller.

25. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, engageable with said type cylinder and rotatable at the same surface speed and constantly driven by said motor, a reservoir for liquid ink, said roller being above the level of the liquid ink of the reservoir, and means for supplying ink from said reservoir to said roller.

26. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, underneath said type cylinder, engageable with said type cylinder and rotatable at the same surface speed and constantly driven by said motor, a reservoir for liquid ink, underneath said inking roller, said roller being above the level of the liquid ink of the reservoir, means for supplying ink from said reservoir to said roller, and means for removing the surplus ink supply and returning it to the reservoir.

27. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, engageable with said type cylinder and rotatable at the same surface speed and constantly driven by said motor, a reservoir for liquid ink, means for supplying ink from said reservoir to said roller, and means for removing the surplus ink supply and returning it to the reservoir.

28. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, underneath said type cylinder, engageable with said type cylinder and rotatable at the same surface speed and constantly driven by said motor, a reservoir for liquid ink underneath said inking roller, said roller being above the level of the liquid ink of the reservoir, and means for supplying ink from said reservoir to said roller.

29. A slip printing device comprising a constantly driven motor, an intermittently driven type cylinder driven from said motor and rotatable about a horizontal axis, means for initiating the rotation of said type cylinder, means for stopping said type cylinder in a definite position, an inking roller rotatable about a horizontal axis, engageable with said type cylinder and rotatable at the same surface speed and constantly driven by said motor, a reservoir for liquid ink and means for supplying ink from said reservoir to said roller.

WALTER H. LYMAN.
PAUL F. FISCHEL.